United States Patent
Barbe et al.

(10) Patent No.: US 12,052,232 B2
(45) Date of Patent: Jul. 30, 2024

(54) MULTIPLE RELYING PARTIES IN A SINGLE-SIGN-ON ENVIRONMENT

(71) Applicant: DASHLANE SAS, Paris (FR)

(72) Inventors: Quentin Barbe, Montrouge (FR); Cyril Leclerc, Paris (FR); Frederic Rivain, Paris (FR); Guillaume Maron, Paris (FR)

(73) Assignee: DASHLANE SAS (FR)

( * ) Notice: Subject to any disclaimer, the term of this patent is extended or adjusted under 35 U.S.C. 154(b) by 273 days.

(21) Appl. No.: 17/660,086

(22) Filed: Apr. 21, 2022

(65) Prior Publication Data

US 2023/0038940 A1    Feb. 9, 2023

Related U.S. Application Data

(60) Provisional application No. 63/229,388, filed on Aug. 4, 2021.

(51) Int. Cl.
*H04L 9/40* (2022.01)
*H04L 9/08* (2006.01)

(52) U.S. Cl.
CPC ........ *H04L 63/0815* (2013.01); *H04L 9/0825* (2013.01); *H04L 9/085* (2013.01); *H04L 63/083* (2013.01)

(58) Field of Classification Search
CPC ... H04L 63/0815; H04L 9/0825; H04L 9/085; H04L 63/083; H04L 9/321; H04L 9/3226
See application file for complete search history.

(56) References Cited

U.S. PATENT DOCUMENTS

| | | | |
|---|---|---|---|
| 2011/0013771 A1* | 1/2011 | Camenisch | H04L 9/3252 380/46 |
| 2013/0145447 A1 | 6/2013 | Maron | |
| 2014/0020073 A1* | 1/2014 | Ronda | H04L 63/0853 726/7 |
| 2014/0373101 A1* | 12/2014 | Mani | H04L 9/3213 726/4 |
| 2018/0183777 A1 | 6/2018 | Guillory | |
| 2018/0323970 A1 | 11/2018 | Maron | |
| 2019/0149332 A1 | 5/2019 | Rivain | |
| 2019/0268156 A1 | 8/2019 | Delmas | |
| 2020/0403993 A1* | 12/2020 | Alexander | H04L 9/321 |
| 2023/0379155 A1* | 11/2023 | Xue | G06F 21/64 |

OTHER PUBLICATIONS

Campbell et al. "Security Assertion Markup Language (SAML) 2.0 Profile for OAuth 2.0 Client Authentication and Authorization Grants." May 2015 pp. 1-15.

* cited by examiner

*Primary Examiner* — J. Brant Murphy

(57) ABSTRACT

A system and method for providing secure Single-Sign-On (SSO) authentication in a zero-knowledge architecture. A first server component may operate as a first relying party in a first SSO flow. When the user of an application successfully authenticates to a first identity provider, a first part of a secret key may be provided to the application. Additionally, a second server component may operate as a second relying party in a second SSO flow. When the first part of the secret key is received by the application, authentication information may be provided to a second identity provider. Based on a successful authentication, a second part of the secret key may be provided to the application. The first and second parts of the secret key may be combined by the application to generate a final secret key that may be used to decipher encrypted user data.

20 Claims, 6 Drawing Sheets

MULTIPLE RELYING PARTIES IN A SINGLE-SIGN-ON ENVIRONMENT

CROSS-REFERENCE TO RELATED APPLICATIONS

This application claims the benefit of U.S. Provisional Patent Application No. 63/229,388, titled "DOUBLE RELYING PARTIES IN SINGLE-SIGN-ON ENVIRONMENT," filed Aug. 4, 2021, which is incorporated by reference herein in its entirety.

BACKGROUND

Single-Sign-On (SSO) authentication, which allows users to sign into various systems with a single set of credentials, is oftentimes useful to implement in enterprise information technology infrastructures that may include a variety of business applications/services (e.g., email, messaging, corporate intranet). For instance, SSO may limit a number of authentication credential sets that users have to remember and may provide an enterprise with centralized control of user access to various enterprise services and/or information. This may enable the enterprise to ensure password policies are enforced, provide a centralized audit trail, control a level of access each user has, etc.

Technical problems may arise, however, when implementing SSO authentication in a zero-knowledge architecture, where sensitive user data may be encrypted by a local application and stored by a service.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

As will also be understood from the foregoing disclosure, in an aspect, the present technology relates to a system and method for providing secure Single-Sign-On (SSO) authentication in a zero-knowledge architecture. In an example, the method includes providing secure Single-Sign-On authentication in a zero-knowledge architecture, comprising: receiving a login request to access user data; requesting a first part of a secret key from a first relying party; receiving a redirect message from the first relying party to authenticate to a first identity provider; in response to a successful first authentication with the first identity provider using first authentication information, receiving first authentication proof from the first identity provider; providing the first authentication proof to the first relying party; receiving the first part of the secret key from the first relying party; requesting a second part of the secret key from a second relying party; receiving a redirect message from the second relying party to authenticate to a second identity provider; in response to a successful second authentication with the second identity provider using second authentication information, receiving second authentication proof from the second identity provider; providing the second authentication proof to the second relying party; receiving the second part of the secret key from the second relying party; using the first part and the second part of the secret key to compute a final secret key; and using the final secret key to decrypt the user data.

In another example, the system includes at least one processor; and memory storing instructions that, when executed by the at least one processor, cause the system to receive a login request to access user data; request a first part of a secret key from a first relying party; receive a redirect message from the first relying party to authenticate to a first identity provider; in response to a successful first authentication with the first identity provider using first authentication information, receive first authentication proof from the first identity provider; provide the first authentication proof to the first relying party; receive the first part of the secret key from the first relying party; request a second part of the secret key from a second relying party; receive a redirect message from the second relying party to authenticate to a second identity provider; in response to a successful second authentication with the second identity provider using second authentication information, receive second authentication proof from the second identity provider; provide the second authentication proof to the second relying party; receive the second part of the secret key from the second relying party; use the first part and the second part of the secret key to compute a final secret key; and use the final secret key to decrypt the user data.

In another example, a computer-readable medium is provided storing instructions that, when executed by a computer, cause the computer to: receive a login request to access user data; request a first part of a secret key from a first relying party; receive a redirect message from the first relying party to authenticate to a first identity provider; in response to a successful first authentication with the first identity provider using first authentication information; receive first authentication proof from the first identity provider; provide the first authentication proof to the first relying party; receive the first part of the secret key from the first relying party; request a second part of the secret key from a second relying party; receive a redirect message from the second relying party to authenticate to a second identity provider; in response to a successful second authentication with the second identity provider, receive second authentication proof from the second identity provider; provide the second authentication proof to the second relying party; receive the second part of the secret key from the second relying party; use the first part and the second part of the secret key to compute a final secret key; and use the final secret key to decrypt the user data.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

Figure 1A:
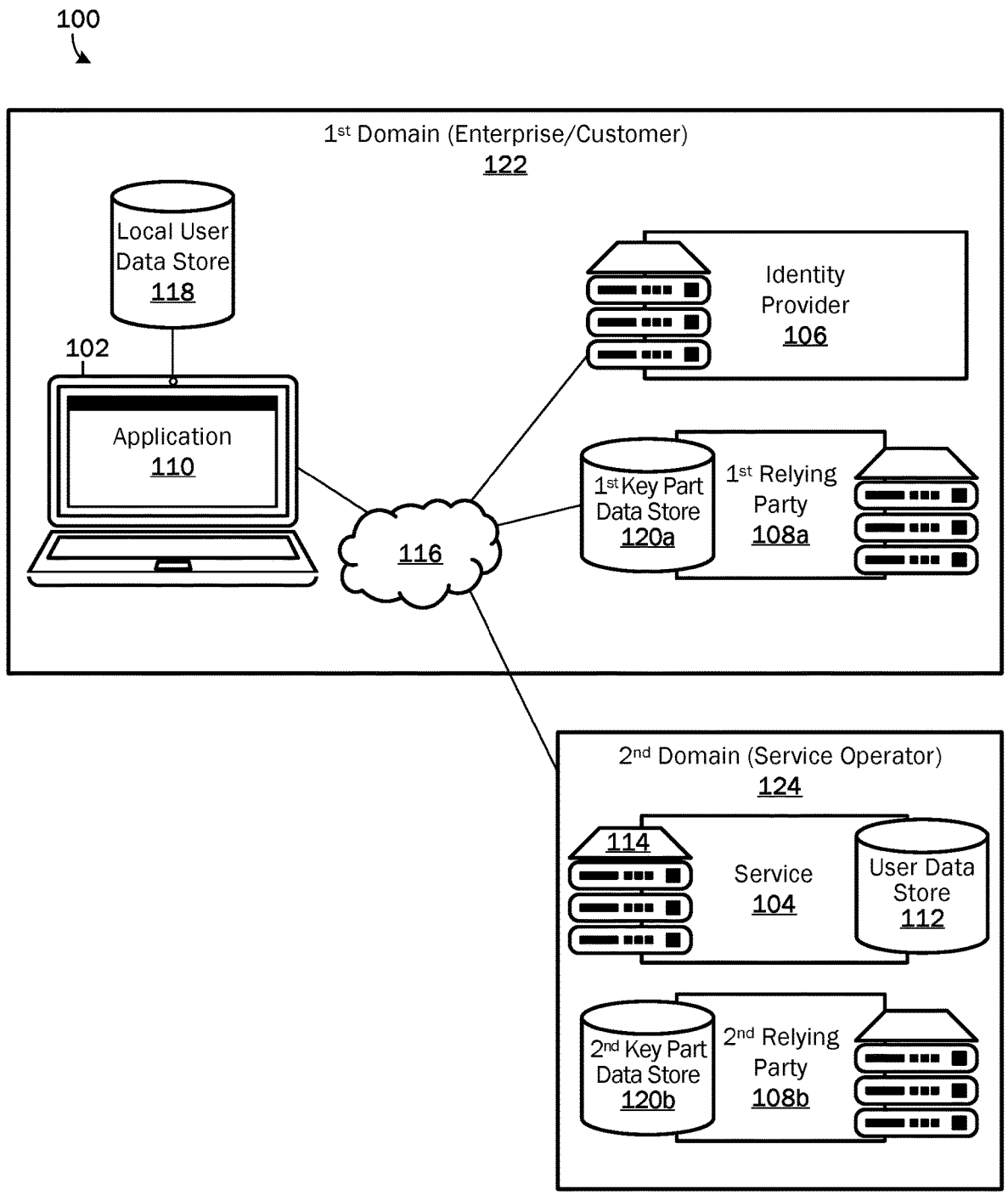
FIG. 1A illustrates an example system for providing secure SSO authentication in a zero-knowledge architecture.

In the following detailed description, references are made to the accompanying drawings that form a part hereof, and in which are shown by way of illustrations specific embodiments or examples. However, examples may be implemented in many different forms and should not be construed as limited to the embodiments set forth herein; rather, these examples are provided so that this disclosure will be thorough and complete, and will fully convey the scope of the examples to those skilled in the art. Examples may be practiced as methods, systems or devices. Accordingly, examples may take the form of a hardware implementation, an entirely software implementation or an implementation combining software and hardware aspects. The following detailed description is, therefore, not to be taken in a limiting sense.

Examples of the disclosure provide methods and systems to improve user convenience and security during authentication. A zero-knowledge architecture may reduce, limit, or remove unauthorized access to user data. For example, a service handling sensitive data (e.g., passwords, identification, financial information) may implement a zero-knowledge architecture, wherein the service does not have access to user data stored or transmitted by servers in the computing environment implementing the service. In an example of a zero-knowledge architecture, the user data may be encrypted by a user device prior to being provided to the service and may be decrypted by the user device for access by the user. As a result of such encryption techniques, the user data provided to and/or processed by the service may be opaque to other computing devices and functions (e.g., one or more other services or servers, devices of other users of the service, etc.), such that the service may be unable to access the plaintext content of the user data, and may instead only have access to the encrypted representation of the user data.

Technical problems may arise when implementing SSO authentication in a zero-knowledge architecture. For example, typically, the user data may be encrypted using a secret key derived from a master password that may be used to access the application. However, generally, an identity provider may not provide data that can be used as key material for encryption. For example, when a password is used to authenticate to the identity provider, this password may not be communicated to the relying party, and thus a secret key cannot be derived from it.

One solution to this problem may be to implement a server component acting as a relying party in the SSO authentication flow. The server component may be configured to hold a random secret key per user, which may be used to encrypt/decrypt user data, and which may be delivered to the application upon successful SSO authentication. While such an implementation may be workable, various security vulnerabilities may be introduced. For example, if the server component is compromised, secret keys for a plurality of users can be accessed and stolen. Additionally, if the relying party is operated by a third party, the third party needs to be fully trusted, since it has secret keys for a plurality of users. Additionally, in examples, encrypted data may be stored locally on a user computing device (e.g., encrypted data may get written to storage on the user computing device for performance reasons). Thus, in some examples, compromising the secret keys may lead to a full compromise of the user data if a malicious user is able to access the encrypted user data.

Accordingly, systems and methods may be implemented to improve the security of such a system, while providing a user experience typical of SSO authentication. In an example, a first server component may be implemented that may operate as a first relying party in a first SSO flow. When the user of an application successfully authenticates to a first identity provider associated with the first relying party, a first part of a secret key may be provided to the application. Additionally, a second server component may be implemented that may operate as a second relying party in a second SSO flow. When the first part of the secret key is received by the application, the application may provide authentication information to a second identity provider associated with the second relying party. Based on a successful authentication, a second part of the secret key may be provided to the application. In an example, the first and second parts of the secret key may be combined by the application to generate a final secret key that may be used to decipher encrypted user data. In some examples, the system may be extended to include additional relying parties and/or identity providers.

As will be understood from the examples in the following disclosure, various technical advantages may result from the present technology. For instance, having N (a number greater than 1) relying parties may allow the secret key to be protected even in case of compromise of N−1 relying parties, which adds extra safety for more security-sensitive use cases. For example, when two relying parties are implemented, no user data may be at risk if one of the relying parties is compromised, since the attacker still does not have the other part of the secret key. Additionally, in some examples, both relying parties may be operated by untrusted third parties, since each relying party may not have enough data to build the final secret key. Thus, privacy of end users may be improved.

With reference now to FIG. 1A, an example system 100 for providing secure SSO authentication in a zero-knowledge architecture is depicted. As illustrated, the system 100 includes a user computing device 102, a server 114, one or more identity provider computing devices (herein referred to as identity providers 106a-n, or generally, 106), and two or more relying party computing devices (herein referred to generally as relying parties 108a-n, or generally, 108). The user computing device 102, for example, may be a mobile computing device, a tablet computing device, a laptop computing device, a desktop computing device, or a personal computing device, among other computing devices. The server 114 may be a computing device, including, but not limited to, a desktop computing device, a server computing device, or a distributed computing device, among other computing devices. In an example, the identity provider(s) 106 and relying parties 108 may also be any of a variety of computing devices according to aspects disclosed herein. While each of user computing device 102, server 114, identity provider(s) 106, and relying parties 108 are illustrated as one element in system 100, it will be appreciated that, in other examples, any number of computing devices may be used to provide the functionality discussed herein. The user computing device 102, server 114, identity provider(s) 106, and relying parties 108 may be communicatively connected using one or a combination of networks 116. For example, the one or combination of networks 116 can include a local-area network, a wide-area network, or the Internet, among other networks.

The user computing device 102 may comprise an application 110. The application 110 may be used by a user of the user computing device 102 to access a service 104 provided by the server 114. In some examples, the user computing device 102 may be implemented in a first domain 122, such as in a network environment of an enterprise. As used herein a domain refers to a group of computing resources that are accessible according to a common security architecture. As an example, the application 110 may be a user data management application 110 that communicates with the service 104 to store and access encrypted user data. As an example, the user data management service 104 may be a password manager service configured to store one or more passwords for one or more users, an encrypted file storage service configured to store one or more encrypted documents/files for one or more users, or the like. The service 104, for example, may store the encrypted user data in a user data store 112. In some examples, encrypted user data may additionally be stored locally on the user computing device 102 in a local user data store 118. The user data store 112 and local user data store 118 may comprise a storage device (e.g., computer memory, a hard drive, a flash drive, etc.), a database, or a file server, among other data stores. As should be appreciated, a variety of applications 110 and/or services 104 may be used according to aspects disclosed herein. Further, while only one user device 102 is illustrated in the example system 100, any number of user devices may be used according aspects disclosed herein.

In an example, the user data stored in the user data store 112 and/or local user data store 118 may be encrypted using a cryptographic key (herein referred to as a final secret key). According to an aspect of the present disclosure, the final secret key may be computed by the application 110 using a plurality of secret cryptographic key parts. A variety of cryptographic algorithms may be used, including, but not limited to, Advanced Encryption Standard (AES), Data Encryption Standard (DES), Rivest-Shamir-Adleman (RSA), and Elliptic Curve Cryptography (ECC), among others. In an example, the encrypted user data may comprise an encrypted password, an encrypted cryptographic key, an encrypted document/file, etc. According to an example, the encrypted user data may be encrypted by the final secret key, wherein the application 110 may generate the final secret key, which may be used to generate the encrypted data.

According to aspects disclosed herein, the application 110 may be configured to generate the final secret key based on a plurality of parts of a secret key. In an example, each part of the secret key may be generated randomly (e.g., using a cryptographically secure pseudorandom number generator). Additionally, each part of the secret key may be generated independently (e.g., by the application 110 or by the relying party 108 that stores them). In an example, each part of the secret key may have a same length as the final secret key, which may help to ensure that any one part of the secret key may not reveal more information than another part of the final secret key. In an example, the final secret key may be computed by XORing the parts of the secret key (e.g., applying an exclusive OR function to the two or more parts of the secret key).

For example, the application 110 may derive the final secret key based on a first cryptographic key part (generally referred to herein as a first part of the secret key) and a second cryptographic key part (generally referred to herein as a second part of the secret key), where all parts of the secret key are associated with the same user. In some examples, the first part of the secret key may be stored in a first key part data store 120a in association with a first relying party 108a, and the second part of the secret key may be stored in a second key part data store 120b in association with a second relying party 108b. Thus, an unencrypted representation of the encrypted data (e.g., as may be generated using the final secret key) may be unavailable to the service 104, thereby maintaining aspects of a zero-knowledge architecture described herein.

In some examples, and as depicted in FIG. 1A, the first relying party 108a may be deployed and/or executed on a computing device in the first domain 122. Accordingly, the first part of secret keys stored by the first relying party 108a may not leave the enterprise's domain/infrastructure. In an example, the first relying party 108a may be operated by the enterprise for which SSO is being provided, or by a third party.

In some examples, in order to access information stored as encrypted data, the application 110 may need to obtain all the parts of the secret key and derive the final secret key. For instance, the first part of the secret key may be retrieved from the first relying party 108a. In an example, the first relying party 108a may verify the identity of the user computing device 102 and/or the user of the user computing device 102 before providing the first part of the secret key to the application 110. In an example, the identity/identities may be verified by a first identity provider 106a. The first identity provider 106, for example, may be a trusted computing system within the first domain 122 that operates to issue authentication assertions/proof to a relying party 108. Because the first relying party 108a stores only a part of the cryptographic key, compromising the first relying party 108a may not allow a malicious actor to decrypt the encrypted user data.

In some examples, in response to receiving the first part of the secret key, the application 110 may further operate to retrieve the second part of the secret key from the second relying party 108b. In an example, the second relying party 108b may be deployed and/or executed on a computing device in a second domain 124 that may be different from the first domain 122. In an example, and as depicted in FIG. 1A, the second domain 124 may be a network environment associated with a provider of the service 104. In another example, the second relying party 108b may be implemented in a network environment associated with a third party. In an example, the first relying party 108a and the second relying party 108b may be registered by an identity provider 106 as separate relying parties. Additionally, the relying parties 108 may not share secrets, certificates, or credentials to the identity provider 106. For example, this may ensure that authentication proof for the authentication on one relying party 108a cannot be used as authentication proof with another relying party 108b.

Figure 1B:
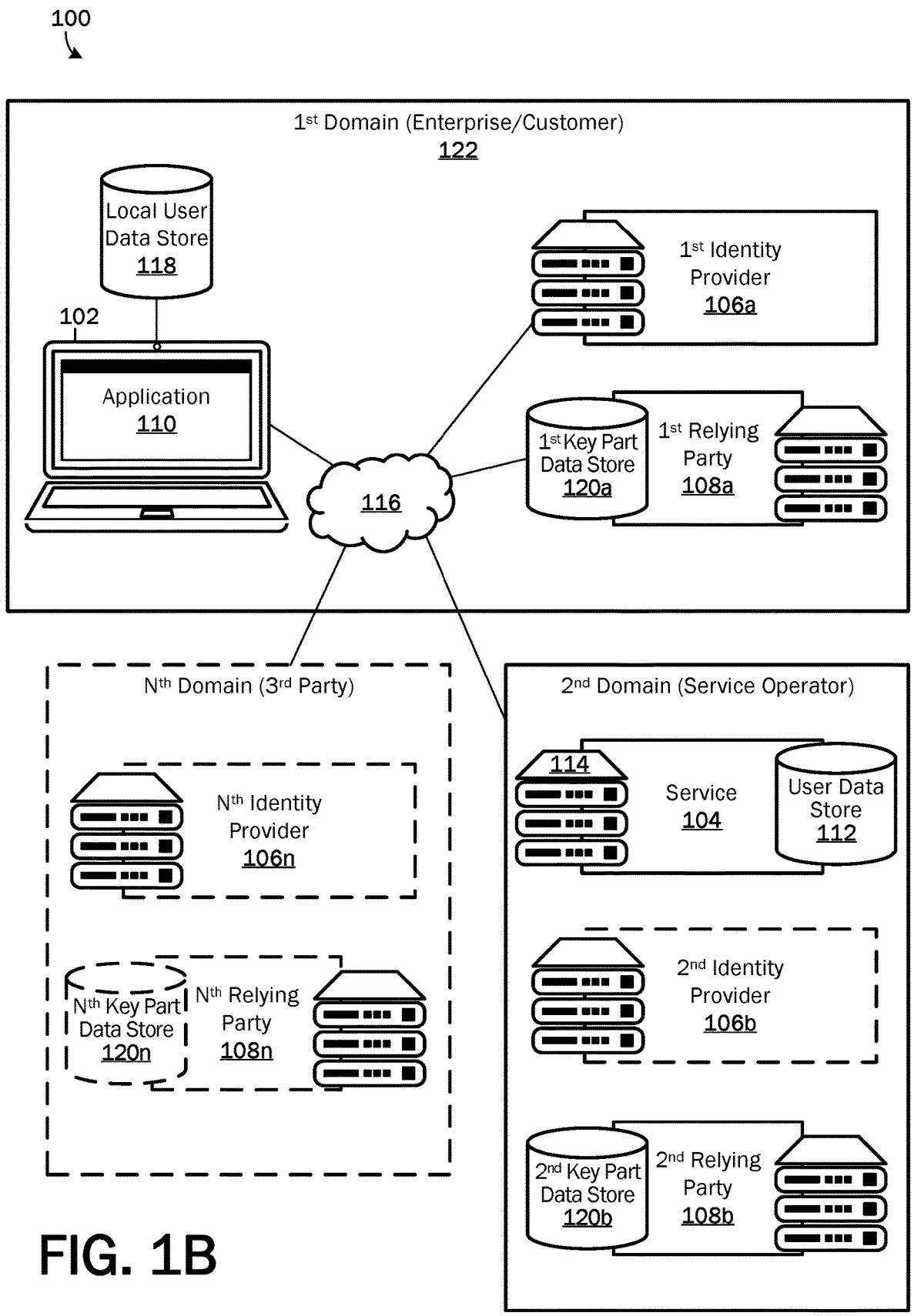
FIG. 1B illustrates another example system for providing secure SSO authentication in a zero-knowledge architecture.

In an example, and as illustrated in FIG. 1B, the second relying party 108b (of may verify the identity of the user computing device 102 and/or the user of the user computing device 102 (via a second identity provider 106b) before providing the second part of the secret key to the application 110. Using multiple identity providers 106a-n, for example, may increase security by requiring authentication of multiple pieces of authentication information before delivering all parts of the secret cryptographic key. Thus, compromising a single identity provider 106a of a plurality of identity providers 106a-n may not allow a malicious user to access all the key parts. In an example, the second identity provider 106b may be implemented in the second domain 124. In another example, the first identity provider 106a and the second identity provider 106b are a same identity provider 106, however each relying party 108a and 108b registers separately with the identity provider 106.

In some examples, the identity provider(s) (generally, 106) may use multi-factor authentication, and may prompt the user to provide at least two pieces of authentication information (e.g., a password and a hardware security key). In some examples, a first piece of authentication information (e.g., password) may be used to obtain authentication proof for the first part of the secret key and a second piece of authentication information (e.g., hardware security key) may be used to obtain authentication proof for the second part of the secret key. For instance, when multiple identity providers (e.g., the first and second identity providers 106a 106b) are implemented, the first identity provider 106a may operate to authenticate the user/user computing device 102 based on the first authentication factor, and the second identity provider 106b may operate to authenticate the user/user computing device 102 based on the second authentication factor. In other examples, each of the identity provider(s) 106 may be configured to authenticate the user with two or more authentication factors.

In examples, SSO authentication sessions may remain open until a designated timeout interval. Accordingly, in some examples, the user may not be required to reauthenticate for the second SSO authentication flow, and the application 110 may operate to use the same SSO session to request the second part of the secret key from the second relying party 108b.

Similar to the first relying party 108a, because the second relying party 108b only stores a part of the cryptographic key, compromising the second relying party 108b may not allow a malicious actor to decrypt the user data. In some examples, the application 110 may communicate with the first relying party 108a and the second relying party 108b directly. In other examples, the application 110 may communicate with the first relying party 108a and the second relying party 108b indirectly (e.g., by way of the service 104). Once the first and second parts of the secret key are retrieved from the first relying party 108a and the second relying party 108b, the application 110 may derive the final cryptographic key using the first and second parts of the secret key and the cryptographic algorithm used to derive the final secret key to encrypt the user data. The application 110 may further operate to decrypt user data stored as encrypted data using the final secret key. In some examples, and as will be described in further detail below, additional relying parties 108c-n and/or additional identity providers 106c-n may be used for providing additional data security.

Figure 2:
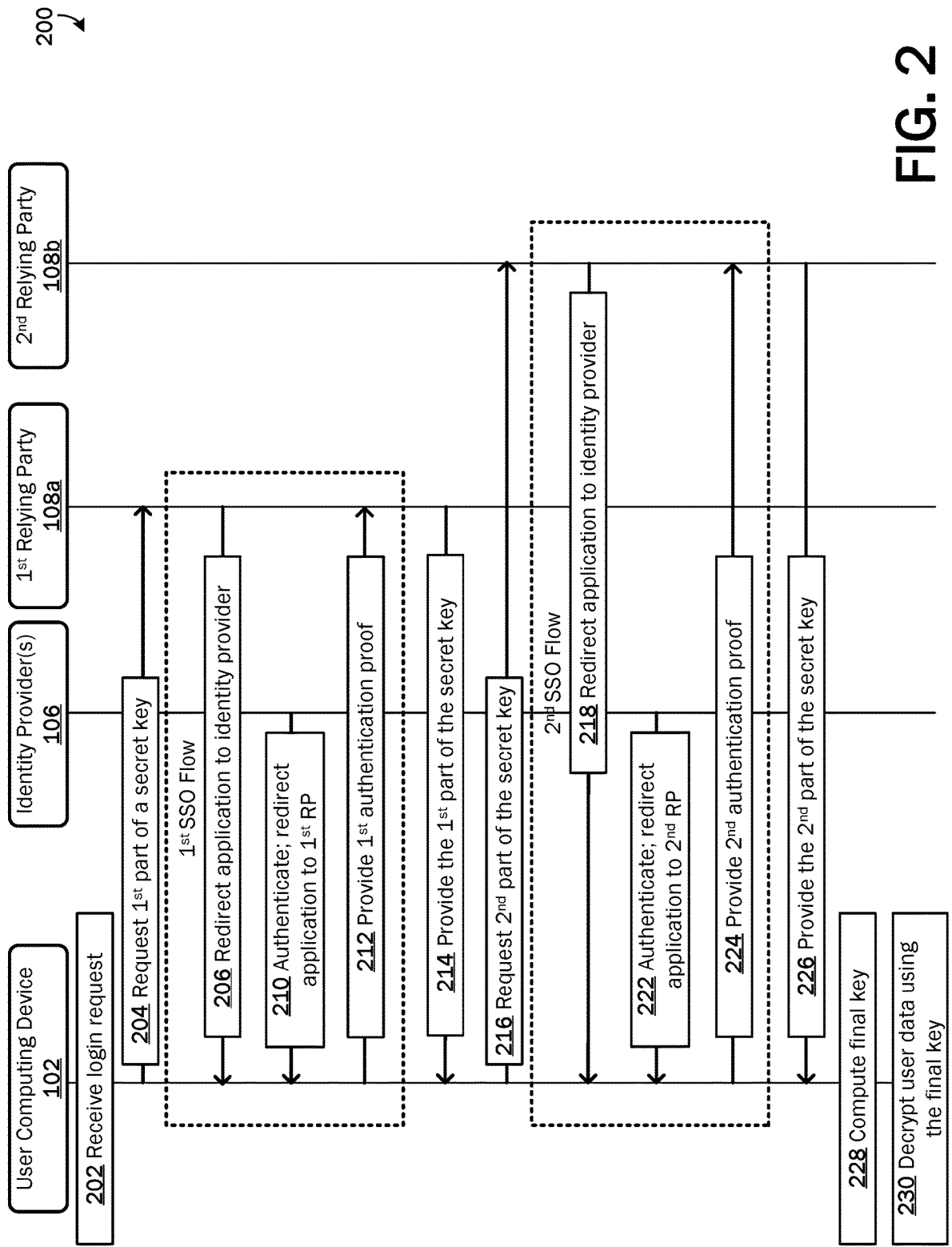
FIG. 2 illustrates an example sequence diagram illustrating an example method for providing secure SSO authentication in a zero-knowledge architecture.

FIG. 2 illustrates an example sequence diagram illustrating an example method 200 for providing secure SSO authentication in a zero-knowledge architecture. For example, FIG. 2 illustrates a process flow of a set of operations occurring at and/or between the user computing device 102, one or more identity provider(s) 106, the first relying party 108a, and the second relying party 108b. The flow may begin at operation 202, where the application 110 may initiate a login process. For example, a login request may be received in association with a user selecting to use the application 110 to access encrypted user data that may be stored by the service 104.

At operation 204, the first part of a secret cryptographic key may be requested. For example, the application 110 may request the first part of the secret key from the first relying party 108a. According to an aspect of the present disclosure, the first relying party 108a may determine that the user computing device 102 and/or user of the user computing device 102 may need to be authenticated, and may initiate a first single-sign-on flow (e.g., operations 206-212), where the application 110 may be redirected to one of the one or more identity provider(s) 106 at operation 206. For example, the application 110 may be configured to authenticate via a browser application operating on the user computing device 102 that may provide a login page (e.g., an SSO portal) served by the identity provider 106. Via the login page, the user of the user computing device 102 may be prompted for a password, a cryptographic key, biometric input, a login, a one-time password (OTP), a second factor input, among other authentication information, or any combination thereof. In an example, a subset of the authentication information provided by the user may be passed to the identity provider 106 as a first piece of authentication information. In some examples, references to operations by the application 110 herein may include operations performed by a browser of a user computing device 102 in conjunction with, or at the direction of, the application 110.

At operation 210, the identity provider 106 may authenticate the user computing device 102 and/or the user of the user computing device 102 and provide the application 110 with proof of authentication (herein referred to as first authentication proof). The identity provider 106 may further redirect the application 110 to the first relying party 108a, where the first authentication proof may be provided to the first relying party 108a at operation 212.

At operation 214, the first authentication proof may be validated by the first relying party 108a. In response to a successful validation, the first part of the secret key may be provided to the application 110.

At operation 216, in response to receiving the first part of the secret key, the second part of the secret cryptographic key may be requested. For example, the application 110 may request the second part of the secret key from the second relying party 108b. According to an aspect of the present disclosure, the second relying party 108b may determine that the user computing device 102 and/or user of the user computing device 102 may need to be authenticated, and may initiate a second single-sign-on flow (e.g., operations 218-224), where the application 110 may be redirected to the identity provider 106 at operation 218. As should be appreciated, in other examples, the application 110 may be redirected to a second identity provider that may be different from the identity provider 106 used to authenticate the user and provide the first authentication proof. For example, the application 110 may be configured to authenticate via the login page (e.g., SSO portal) served by the identity provider 106, where authentication information (e.g., a second piece of authentication information) may be provided by user computing device 102 to the identity provider 106. In an example, the same SSO session may be used to request the second part of the secret key from the second relying party 108b. Accordingly, the user may not be prompted to provide additional authentication information. In another example, explicit authentication information (e.g., a password, a cryptographic key, biometric input, a login, a one-time password (OTP), another second factor input) may be requested from the user (e.g., multi-factor authentication may be utilized).

At operation 222, the identity provider 106 may authenticate the user computing device 102 and/or the user of the user computing device 102 and provide the application 110 with proof of authentication (herein referred to as second authentication proof). The identity provider 106 may further redirect the application 110 to the second relying party 108a, where the second authentication proof may be provided to the second relying party 108b at operation 224.

At operation 226, the second authentication proof may be validated by the second relying party 108b. In response to a successful validation, the second part of the secret key may be provided to the application 110. In some examples, where additional relying parties 108 may be implemented, additional parts of the secret key may be requested from the additional relying parties 108, where the additional relying parties 108 may provide the requested parts of the secret key based on verification of authentication proof from one or more identity providers 106.

At operation 228, a final secret key may be computed by the application 110 based on the first and second parts of the secret key, and at operation 230, the final secret key may be used to decrypt user data.

Figure 3:
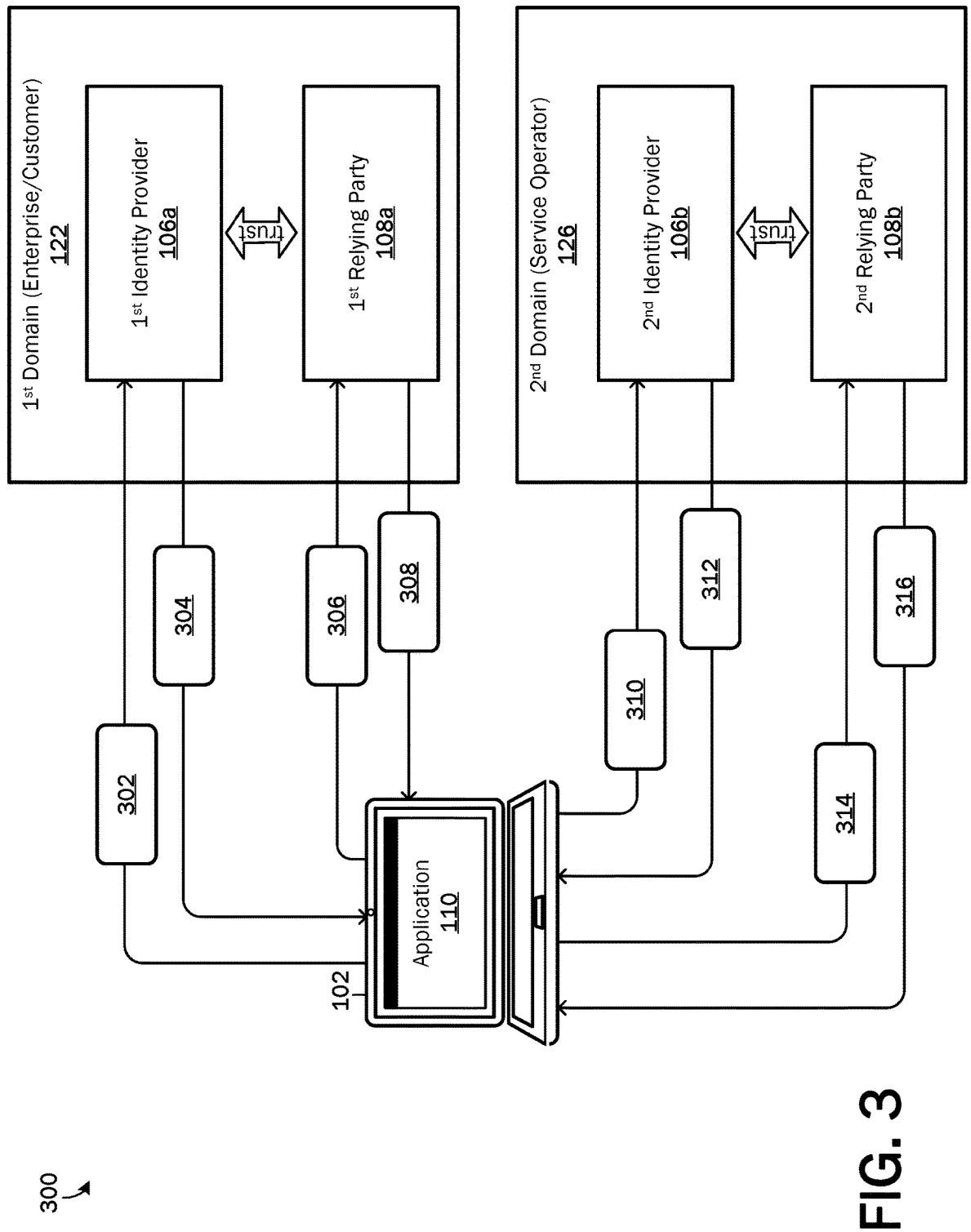
FIG. 3 is a block diagram depicting an example flow of communications in an example system that may include two relying parties and two identity providers.

FIG. 3 is a block diagram depicting an example flow of communications in an example system 300 that may include two relying parties 108 and two identity providers 106. For example, the communications may be exchanged between the user computing device 102, the first relying party 108a, the first identity provider 106a, the second relying party 108b, and the second identity provider 106b as part of accessing and decrypting user data stored by a zero-knowledge data management service in a distributed SSO environment. Communication 302 may represent a first piece of authentication information that may be provided to the first identity provider 106a for authenticating the user/user computing device 102 in a first SSO flow. For example, the user of the user computing device 102 may be prompted to provide an input of a password, a cryptographic key, biometric input, a login, a one-time password (OTP), other authentication information, or a combination thereof. In an example, a first piece of the authentication information provided by the user may be passed to the first identity provider 106a, and the first identity provider 106a may operate to authenticate the user/user computing device 102 based on the first piece of authentication information. Upon successful authentication of the first piece of authentication information, a first authentication proof may be communicated to the application 110, which is represented by communication 304. Communication 306 may represent the first authentication proof being provided to the first relying party 108a. Upon verification of the first authentication proof, the first relying party 108a may provide the first part of the secret key to the application 110, which is represented as communication 308.

As mentioned above, aspects of the present disclosure include a second SSO flow, where communication 310 may represent a second piece of authentication information provided by the user that may be provided to the second identity provider 106b. In an example, the second piece of the authentication information may be passed to the second identity provider 106b, and the second identity provider 106b may operate to authenticate the user/user computing device 102 based on the second piece of authentication information. For instance, the second piece of authentication information may include the biometric input or other authentication information. Upon successful authentication of the second piece of authentication information, a second authentication proof may be communicated to the application 110, which is represented by communication 312. Communication 314 may represent the second authentication proof being provided to the second relying party 108b. Upon verification of the second authentication proof, the second relying party 108b may provide the second part of the secret key to the application 110, which is represented as communication 316. Accordingly, based on the first part of the secret key and the second part of the secret key, the application 110 may be able to derive the final secret key and use the final secret key to decrypt user data stored by the zero-knowledge data management service 104 (e.g., user data management service). In an example, the example system 300 shown in FIG. 3 may provide increased security over other SSO authentication systems, where either of the identity providers 106a, 106b or either of the relying parties 108a, 108b may be compromised without revealing the secret key or the final secret key.

Figure 4:
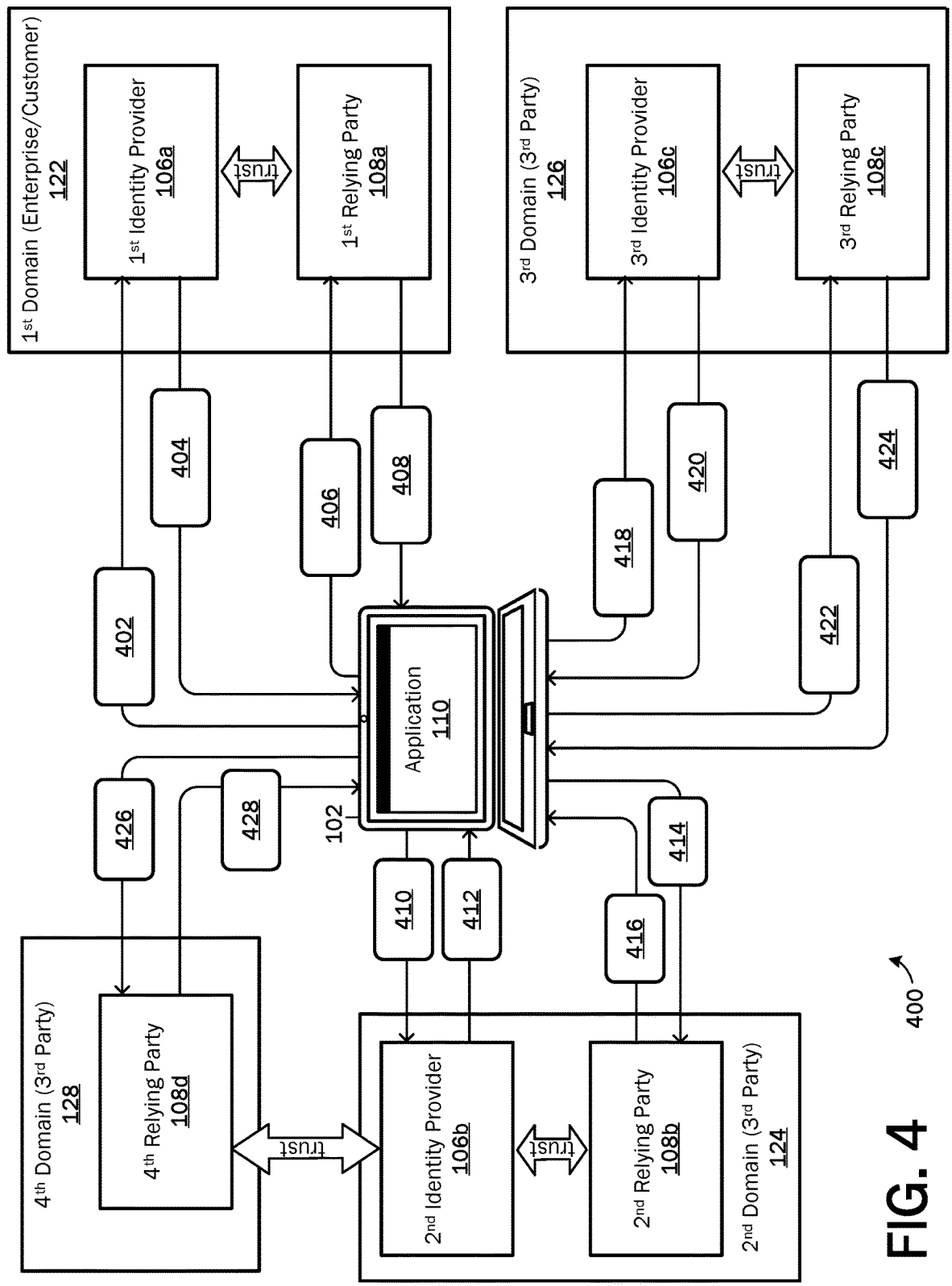
FIG. 4 is a block diagram depicting an example flow of communications in an example system that may include four relying parties and three identity providers.

FIG. 4 is a block diagram depicting an example flow of communications in an example system 400 that may include four relying parties 108 and three identity providers 106. For example, the communications may be exchanged between the user computing device 102, the first relying party 108a, the first identity provider 106a, the second relying party 108b, the second identity provider 106b, the third relying party 108c, the third identity provider 106c, and the fourth relying party 108d as part of accessing and decrypting user data stored by a zero-knowledge data management service in a distributed SSO environment. As should be appreciated, the number of relying parties 108 and identity provider 106 depicted in FIG. 4 are for illustrative purposes only and are not restrictive of the various number/configuration of relying parties and identity providers used. That is, in other examples, more or fewer identity providers 106 and/or relying parties 108 may be implemented. In some implementations, the number of identity providers 106 and/or relying parties 108 may be based on a level of desired security for protecting the user data and associated keys.

In an example, the first relying party 108a and the first identity provider 106a may operate on a first domain 122, which may include the infrastructure of an enterprise/customer that consumes a service 104 offered by a service operator. In another example, the second relying party 108b and the second identity provider 106b may operate on a second domain 124, which may include the infrastructure of a third party. In another example, the third relying party 108c and the third identity provider 106c may operate on a third domain 126, which may include the infrastructure of another third party. In another example, the fourth relying party 108d may operate on a fourth domain 128, which may include the infrastructure of another third party. In an example, as each relying party 108 only stores a part of the secret key, the relying parties 108 may be operated by untrusted third parties without compromising the secret key.

Communication 402 may represent a first piece of authentication information that may be provided to the first identity provider 106a for authenticating the user/user computing device 102 in a first SSO flow. For example, the user of the user computing device 102 may be prompted to provide an input of a password, a cryptographic key, biometric input, or a combination thereof, among other authentication information. In an example, a first piece of the authentication information provided by the user may be passed to the first identity provider 106a, and the first identity provider 106a may operate to authenticate the user/user computing device 102 based on the first piece of authentication information. For instance, the application 110 may pass a first authentication factor input by the user to the first identity provider 106a. Upon successful authentication of the first piece of authentication information, a first authentication proof may be communicated back to the application 110, which is represented by communication 404. Communication 406 may represent the first authentication proof being provided to the first relying party 108a. Upon verification of the first authentication proof, the first relying party 108a may provide the first part of the secret key to the application 110, which is represented as communication 408.

As shown, a second SSO flow may be performed, where communication 410 may represent a second piece of authentication information provided by the user that may be provided to the second identity provider 106b. In an example, the second piece of the authentication information may be passed to the second identity provider 106b, and the second identity provider 106b may operate to authenticate the user/user computing device 102 based on the second piece of authentication information. For instance, the second piece of authentication information may include a second authentication factor input by the user. Upon successful authentication of the second piece of authentication information, a second authentication proof may be communicated back to the application 110, which is represented by communication 412. Communication 414 may represent the second authentication proof being provided to the second relying party 108b. Upon verification of the second authentication proof, the second relying party 108b may provide the second part of the secret key to the application 110, which is represented as communication 416.

Further as shown, a third SSO flow may be performed, where communication 418 may represent a third piece of authentication information that may be provided to the third identity provider 106c. in an example, the third piece of the authentication information may be passed to the third identity provider 106c, and the third identity provider 106c may operate to authenticate the user/user computing device 102 based on the third piece of authentication information. For instance, the third piece of authentication information may include a third authentication factor input by the user. Upon successful authentication of the third piece of authentication information, a third authentication proof may be communicated back to the application 110, which is represented by communication 420. Communication 422 may represent the third authentication proof being provided to the third relying party 108c. Upon verification of the third authentication proof, the third relying party 108c may provide the third part of the secret key to the application 110, which is represented as communication 424.

Additionally, a fourth SSO flow may be performed, where communication 426 may represent the second authentication proof from the second identity provider 106b. For example, a trust relationship may exist between the fourth relying party 108d and the second identity provider 106b, and the fourth relying party 108d may verify the second authentication proof. Upon verification of the second authentication proof, the fourth relying party 108d may provide the fourth part of the secret key to the application 110, which is represented as communication 428. Accordingly, based on the first, second, third, and fourth parts of the secret key, the application 110 may be able to derive the final secret key and use the final secret key to decrypt user data stored by the zero-knowledge data management service 104 (e.g., user data management service). The example system 400 shown in FIG. 4 may provide increased security over other SSO authentication systems and, in some examples, the example system 300 shown in FIG. 3, where up to two identity providers 106 or up to three relying parties 108 may be compromised without revealing the private key or final secret key. Additionally, since each relying party 108 is hosted in the same infrastructure as the corresponding identity provider 106—with the exception of the fourth relying party 108d—a full compromise of up to two infrastructures (or three infrastructures if the service operator infrastructure is not compromised) may not reveal the private key or final secret key. As mentioned above, the number of identity providers 106 and/or relying parties 108 may be based on a level of desired security for protecting the user data and associated keys. The present technology may further be used to improve reliability. In an example, a subset of the parts of the secret key may be used to generate the final secret key. For instance, in a system where five relying parties 108 (and five secret key parts) may be implemented, a subset of the five secret key parts (e.g., three secret key parts) may be used to build the final secret key. As an example, Shamir's Secret Sharing (SSS) or another secret sharing scheme may be used to build the final secret key. As can be appreciated, if a relying party 108 is unavailable or otherwise unable to provide a secret key part, the final secret key can still be generated.

Figure 5:
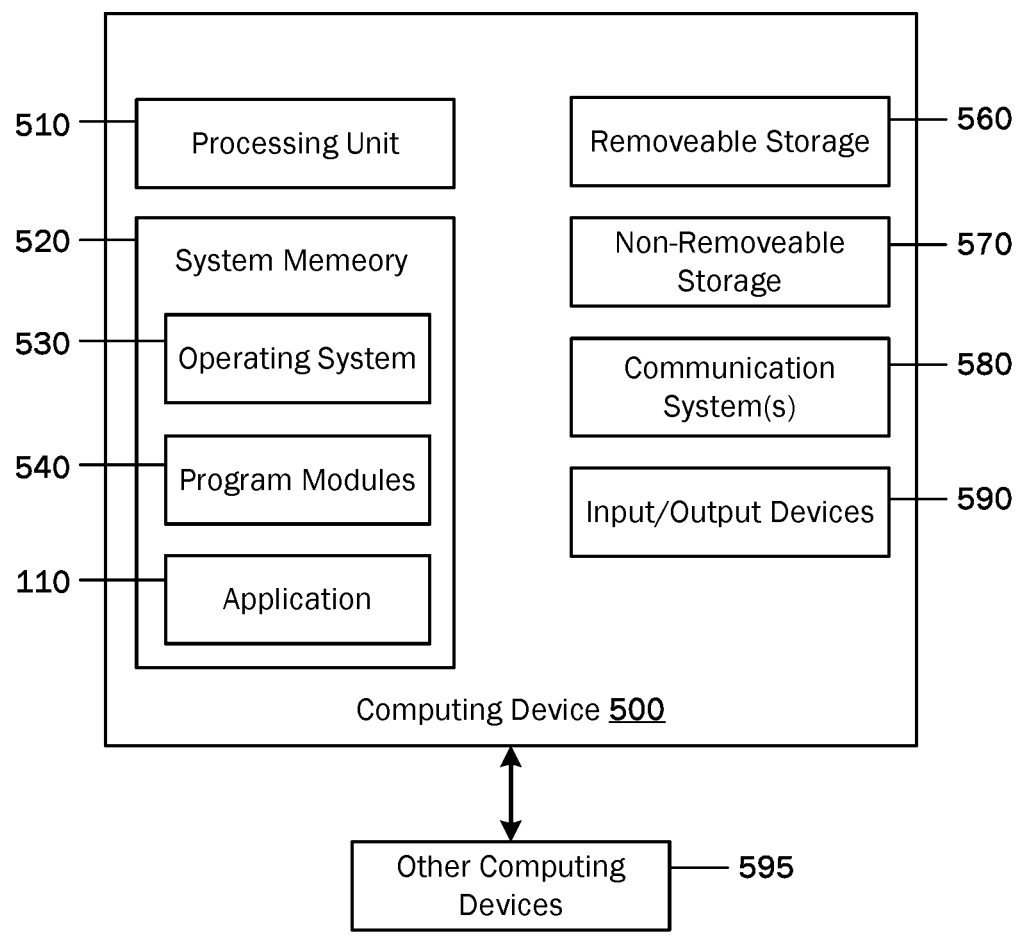
FIG. 5 is a block diagram of an example computing device, which may be integrated or associated with one or more of the computing elements described herein.

FIG. 5 depicts an example computing device 500 according to the present application. The computing device 500, or various components and systems of the computing device 500, may be integrated or associated with one or more of the computing elements described above, such as user device 102, local data store 118, identity provider 106, relying party 108, server 114, user data store 112, etc. As shown in FIG. 5, the physical components (e.g., hardware) of the computing device are illustrated and these physical components may be used to practice the various aspects of the present disclosure.

The computing device 500 may include at least one processing unit 510 and a system memory 520. The system memory 520 may include, but is not limited to, volatile storage (e.g., random access memory), non-volatile storage (e.g., read-only memory), flash memory, or any combination of such memories. The system memory 520 may also include an operating system 530 that controls the operation of the computing device 500 and one or more program modules 540. The program modules 540 may be responsible for performing one or more of the operations and/or exchanging one or more of the communications described above with reference to FIGS. 2-4 for providing secure SSO authentication in a zero-knowledge architecture. A number of different program modules and data files may be stored in the system memory 520. While executing on the processing unit 510, the program modules 540 may perform the various processes described above.

The computing device 500 may also have additional features or functionality. For example, the computing device 500 may include additional data storage devices (e.g., removable and/or non-removable storage devices) such as, for example, magnetic disks, optical disks, or tape. These additional storage devices are labeled as a removable storage 560 and a non-removable storage 570.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 500 on the single integrated circuit (chip). The disclosure may also be practiced using other technologies capable of performing logical operations such as, for example, AND, OR, and NOT, including but not limited to mechanical, optical, fluidic, and quantum technologies.

The computing device 500 may include one or more communication systems 580 that enable the computing device 500 to communicate with other computing devices 595 such as, for example, servers, routers, network devices, client computing devices, etc. Examples of communication systems 580 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 500 may also have one or more input devices and/or one or more output devices shown as input/output devices 590. These input/output devices 590 may include a keyboard, a sound or voice input device, haptic devices, a touch, force and/or swipe input device, a display, speakers, etc. The aforementioned devices are examples and others may be used.

The term computer-readable media as used herein may include non-transitory computer storage media. Computer storage media may include volatile and nonvolatile, removable and non-removable media implemented in any method or technology for storage of information, such as computer readable instructions, data structures, or program modules.

The system memory 520, the removable storage 560, and the non-removable storage 570 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure." Also, the term "exemplary" is intended to refer to an example or illustration. As used herein, the terms "use," "using," and "used" may be considered synonymous with the terms "utilize," "utilizing," and "utilized," respectively.

Although exemplary embodiments of systems and methods for protecting computing systems using declared constraints have been specifically described and illustrated herein, many modifications and variations will be apparent to those skilled in the art. Accordingly, it is to be understood systems and methods for protecting computing systems using declared constraints constructed according to principles of this disclosure may be embodied other than as specifically described herein. The disclosure is also defined in the following claims, and equivalents thereof.

We claim:

1. A method for providing secure Single-Sign-On authentication in a zero-knowledge architecture, comprising:
    receiving a login request to access user data;
    requesting a first part of a secret key from a first relying party;
    receiving a redirect message from the first relying party to authenticate to a first identity provider;
    in response to a successful first authentication with the first identity provider using first authentication information, receiving first authentication proof from the first identity provider;
    providing the first authentication proof to the first relying party;
    receiving the first part of the secret key from the first relying party;
    requesting a second part of the secret key from a second relying party;
    receiving a redirect message from the second relying party to authenticate to a second identity provider;
    in response to a successful second authentication with the second identity provider using second authentication information, receiving second authentication proof from the second identity provider;
    providing the second authentication proof to the second relying party;
    receiving the second part of the secret key from the second relying party;
    using the first part and the second part of the secret key to compute a final secret key; and
    using the final secret key to decrypt the user data.

2. The method of claim 1, wherein the first identity provider and the second identity provider are a same identity provider.

3. The method of claim 1, wherein a single authentication session is used to provide both of the first authentication proof and the second authentication proof.

4. The method of claim 1, wherein the first identity provider and the second identity provider are different.

5. The method of claim 1, wherein:
    the first authentication information is of a first form factor; and
    the second authentication information is of a second form factor.

6. The method of claim 1, wherein using the first part and the second part of the secret key to compute the final secret key comprises applying an exclusive OR function to the first part and the second part of the secret key.

7. The method of claim 1, further comprising:
requesting a third part of the secret key from a third relying party;
sending the second authentication proof to the second relying party, wherein the second identity provider is trusted by the third relying party;
receiving the third part of the secret key from the third relying party; and
using at least a subset of the first part, the second part, and the third part of the secret key to compute a final secret key.

8. The method of claim 1, further comprising:
requesting a third part of the secret key from a third relying party;
sending the second authentication proof to the second relying party, wherein the second identity provider is trusted by the third relying party;
receiving the third part of the secret key from the third relying party; and
using a subset of two of the first part, the second part, and the third part of the secret key to compute a final secret key.

9. A system for providing secure Single-Sign-On authentication in a zero-knowledge architecture, the system comprising:
at least one processor; and
memory storing instructions that, when executed by the at least one processor, cause the system to:
receive a login request to access user data;
request a first part of a secret key from a first relying party;
receive a redirect message from the first relying party to authenticate to a first identity provider;
in response to a successful first authentication with the first identity provider using first authentication information, receive first authentication proof from the first identity provider;
provide the first authentication proof to the first relying party;
receive the first part of the secret key from the first relying party;
request a second part of the secret key from a second relying party;
receive a redirect message from the second relying party to authenticate to a second identity provider;
in response to a successful second authentication with the second identity provider using second authentication information, receive second authentication proof from the second identity provider;
provide the second authentication proof to the second relying party;
receive the second part of the secret key from the second relying party;
use the first part and the second part of the secret key to compute a final secret key; and
use the final secret key to decrypt the user data.

10. The system of claim 9, wherein the first identity provider and the second identity provider are a same identity provider.

11. The system of claim 9, wherein the first relying party and the second relying party operate in different domains.

12. The system of claim 9, wherein a single authentication session is used to provide both of the first authentication proof and the second authentication proof.

13. The system of claim 9, wherein the first identity provider and the second identity provider are different.

14. The system of claim 9, wherein:
the first authentication information comprises authentication information of a first form factor; and
the second authentication information comprises authentication information of a second form factor.

15. The system of claim 9, wherein the first part and the second part of the secret key are a same size as the final secret key.

16. The system of claim 9, wherein in computing the final key, the system is operative to apply an exclusive OR function to the first part and the second part of the secret key.

17. The system of claim 9, wherein the instructions further cause the system to:
request a third part of the secret key from a third relying party;
send the second authentication proof to the second relying party, wherein the second identity provider is trusted by the third relying party;
receive the third part of the secret key from the third relying party; and
use at least a subset of at least two of the first part, the second part, and the third part of the secret key to compute a final secret key.

18. The system of claim 9, wherein the user data comprises a password.

19. A non-transitory computer-readable medium storing instructions that, when executed by a computer, cause the computer to:
receive a login request to access user data;
request a first part of a secret key from a first relying party;
receive a redirect message from the first relying party to authenticate to a first identity provider;
in response to a successful first authentication with the first identity provider using first authentication information;
receive first authentication proof from the first identity provider;
provide the first authentication proof to the first relying party;
receive the first part of the secret key from the first relying party;
request a second part of the secret key from a second relying party;
receive a redirect message from the second relying party to authenticate to a second identity provider;
in response to a successful second authentication with the second identity provider, receive second authentication proof from the second identity provider;
provide the second authentication proof to the second relying party;
receive the second part of the secret key from the second relying party;
use the first part and the second part of the secret key to compute a final secret key; and
use the final secret key to decrypt the user data.

20. The non-transitory computer-readable medium of claim 19, wherein the instructions further cause the system to:
request a third part of the secret key from a third relying party;
send the second authentication proof to the second relying party, wherein the second identity provider is trusted by the third relying party;
receive the third part of the secret key from the third relying party; and use at least a subset of the first part, the second part, and the third part of the secret key to compute a final secret key.

* * * * *